US010544263B2

(12) United States Patent
Pineau et al.

(10) Patent No.: US 10,544,263 B2
(45) Date of Patent: Jan. 28, 2020

(54) SOFT HAND COPOLYAMIDE COMPOSITION

(71) Applicant: ARKEMA FRANCE, Colombes (FR)

(72) Inventors: Quentin Pineau, Evreux (FR); Bruno D'Herbecourt, Bernay (FR)

(*) Notice: Subject to any disclaimer, the term of this patent is extended or adjusted under 35 U.S.C. 154(b) by 0 days.

(21) Appl. No.: 15/126,492

(22) PCT Filed: Mar. 5, 2015

(86) PCT No.: PCT/FR2015/050536
§ 371 (c)(1),
(2) Date: Sep. 15, 2016

(87) PCT Pub. No.: WO2015/140441
PCT Pub. Date: Sep. 24, 2015

(65) Prior Publication Data
US 2017/0096529 A1    Apr. 6, 2017

(30) Foreign Application Priority Data
Mar. 17, 2014  (FR) ...................... 14 52170

(51) Int. Cl.
C08G 69/40 (2006.01)
C09J 177/02 (2006.01)
C09J 177/10 (2006.01)
C08G 69/44 (2006.01)
C09J 177/12 (2006.01)

(52) U.S. Cl.
CPC ............ C08G 69/44 (2013.01); C08G 69/40 (2013.01); C09J 177/02 (2013.01); C09J 177/12 (2013.01); C08G 2170/20 (2013.01)

(58) Field of Classification Search
USPC .......................... 524/602, 607; 528/208, 310
See application file for complete search history.

(56) References Cited

U.S. PATENT DOCUMENTS

| | | | |
|---|---|---|---|
| 3,377,303 A | 4/1968 | Peerman | |
| 4,234,184 A | 11/1980 | Deleens et al. | |
| 4,361,680 A | 11/1982 | Borg et al. | |
| 4,368,090 A | 1/1983 | Mumcu et al. | |
| 4,438,240 A | 3/1984 | Tanaka et al. | |
| 4,791,164 A | 12/1988 | Wichelhaus et al. | |
| 4,820,796 A * | 4/1989 | Suzuki | C08G 69/44 525/420 |
| 4,846,827 A * | 7/1989 | Sallee | A41D 27/245 604/371 |
| 4,956,423 A * | 9/1990 | Lee | B32B 27/04 525/432 |
| 6,528,615 B2 * | 3/2003 | Hilgers | C08G 69/40 156/166 |
| 8,231,950 B2 * | 7/2012 | Malet | C08G 18/4854 428/35.7 |
| 2002/0043333 A1 * | 4/2002 | Hilgers | C08G 69/40 156/309.9 |
| 2005/0165210 A1 | 7/2005 | Malet et al. | |
| 2013/0171440 A1 * | 7/2013 | Arita | H01L 23/291 428/220 |
| 2013/0177704 A1 * | 7/2013 | Arita | H01L 23/293 427/195 |

FOREIGN PATENT DOCUMENTS

| | | |
|---|---|---|
| EP | 0 095 893 A2 | 12/1983 |
| FR | 2 418 250 A1 | 9/1979 |
| FR | 2 497 518 A1 | 7/1982 |
| FR | 2 846 332 A1 | 4/2004 |
| JP | S56-90875 A | 7/1981 |
| JP | S61-188479 A | 8/1986 |
| JP | H05-320336 A | 12/1993 |
| JP | 2004-051843 A | 2/2004 |
| WO | WO 99/33659 * | 7/1999 |
| WO | WO 2004/037898 A1 | 5/2004 |

OTHER PUBLICATIONS

International Search Report (PCT/ISA/210) dated Jun. 25, 2015, by the European Patent Office as the International Searching Authority for International Application No. PCT/FR2015/050536.
Written Opinion (PCT/ISA/237) dated Jun. 25, 2015, by the European Patent Office as the International Searching Authority for International Application No. PCT/FR2015/050536.
Office Action (Notice of Reasons for Rejection) dated Oct. 10, 2017, by the Japanese Patent Office in Japanese Patent Application No. 2016-557597, and an English Translation of the Office Action. (11 pages).

* cited by examiner

Primary Examiner — Tae H Yoon
(74) Attorney, Agent, or Firm — Thomas F. Roland

(57) ABSTRACT

Composition comprising, on a weight basis, the total being equal to 100%:
from 98% to 100% of at least one copolyamide bearing amide units and polyether units, having a melting point ($T_m$) from about 90 to about 150° C., in particular from about 100° C. to about 125° C., and having a flexural modulus of less than 100 MPa, as determined according to standard ISO 178 (2010);
from 0 to 2% of at least one additive chosen from stabilizers and dyes, or a mixture thereof,
for the manufacture of a heat-sensitive adhesive, in particular a veil, a film, granules, a filament, a grate, a powder or a suspension.

8 Claims, 3 Drawing Sheets

SOFT HAND COPOLYAMIDE COMPOSITION

The present invention relates to a copolyamide composition for manufacturing a heat-sensitive adhesive, in particular a veil, a film, granules, a filament, a grate, a powder or a suspension.

The invention also relates to the said heat-sensitive adhesives and to their use in the textile industry, especially for manufacturing sports articles without stitching.

The stitching present in clothing, especially in tights and stockings, have the drawbacks of being unaesthetic and of having an irritating feel, especially at the feet.

Moreover, sports clothing, especially for winter sports, are used under cold conditions that are occasionally extreme and have the drawback in that the clothing is embrittled by the stitching and made permeable to water and sensitive to breaking at the said stitching.

This drawback was solved hitherto by the use of thermoplastic polyurethanes (TPU) which are used especially in the textile industry as heat-sensitive adhesives for eliminating stitching and which especially have flexibility or suppleness properties.

However, they have the drawback of not withstanding washing, in particular machine washing, especially above 60° C., of being difficult to implement and of yellowing over time, which is detrimental to the aesthetics of the clothing.

Moreover, flexibility may also be afforded by polyamides based on fatty acid dimers as described in patent U.S. Pat. No. 3,377,303. However, they do not withstand washing, in particular machine washing.

As regards conventional copolyamides, they are known to be wash-resistant up to 90° C., to not undergo yellowing over time and to be easy to implement, but they have a lack of flexibility or are too rigid.

PEBAs, as described, for example, in documents FR 99/05430 or FR 05/03713, are also copolymers, and especially copolyamides bearing amide units and polyether units, but which lack hot-bonding properties.

There is thus a need for heat-sensitive adhesives that simultaneously have properties:
of flexibility or suppleness,
of resistance to washing,
of ease of implementation,
which do not yellow over time and which thus have an improved aesthetic aspect and which, finally, have properties of resistance and flexibility under cold conditions.

The Applicant has solved the various problems of the prior art by providing a composition comprising a copolyamide bearing amide units and polyether units, having a melting point ($T_f$) of between about 90 and about 150, in particular from 100 to 125° C., and having a flexural modulus of less than 100 MPa, as determined according to standard ISO 178 (2010).

In the description, Tf or Tm are used without distinction and denote the same thing.

The present invention relates to a composition comprising, on a weight basis, the total being equal to 100%:
from 98% to 100% of at least one copolyamide bearing amide units and polyether units, having a melting point ($T_m$) from about 90 to about 150° C., in particular from about 100° C. to about 125° C., and having a flexural modulus of less than 100 MPa, as determined according to standard ISO 178 (2010);

the said amide unit having the following structure:

$(A)_x/(B)_y/(C)$ resulting from the condensation of unit (A), unit (B) and unit (C) in which:
x=0 or 1, y=0 or 1 and x+y=1 or 2,
A and B corresponding to an aliphatic repeating unit chosen from a unit obtained from at least one amino acid and a unit obtained from at least one lactam, or a unit X.Y obtained from the polycondensation:
of at least one diamine, the said diamine being chosen from a linear or branched aliphatic diamine, a cycloaliphatic diamine and an aromatic diamine or a mixture thereof, and
of at least one dicarboxylic acid, the said diacid being chosen from:
an aliphatic diacid, a cycloaliphatic diacid and an aromatic diacid,
the said diamine and the said diacid comprising from 4 to 36 carbon atoms, advantageously from 6 to 18 carbon atoms;
(C) represents a long-chain aliphatic repeating unit, obtained from an amino acid, a lactam, or a unit X.Y, of C10 or more, especially of C11 and C12, or a mixture thereof, and
(A) and (B) being different from each other when they are both present, and (A and B) being different from (C) when they are present alone or together,
the said polyether units especially being derived from at least one polyalkylene ether polyol or a polyalkylene ether polyamine, especially a polyalkylene ether diol or a polyalkylene ether diamine, with the proviso that when the polyalkylene ether diol is a polyethylene glycol, it is combined with at least one other polyalkylene ether polyol or polyalkylene ether polyamine,
from 0 to 2% of at least one additive chosen from stabilizers and dyes, or a mixture thereof,
for the manufacture of a heat-sensitive adhesive, in particular a veil, a film, granules, a filament, a grate, a powder or a suspension.

For the purposes of the invention, the term "polyamide" (homopolyamide or copolyamide) means the products of condensation of lactams, amino acids and/or diacids with diamines.

As Regards the Amide Unit:

It results from the condensation of unit (A), unit (B) and unit (C).

(A) and (B) correspond to an aliphatic repeating unit which may be obtained from an aminocarboxylic acid (also known as an amino acid), a lactam or a unit corresponding to the formula X.Y, X being a Ca diamine and Y being a Cb diacid, also referred to as (Ca diamine).(Cb diacid), with a representing the number of carbon atoms in the diamine and b representing the number of carbon atoms in the diacid, a and b each ranging from 4 to 36 and advantageously from 6 to 18 carbon atoms.

When the aliphatic repeating unit is obtained from a unit derived from an amino acid, it may be chosen from 9-aminononanoic acid, 10-aminodecanoic acid, 10-aminoundecanoic acid, 11-aminoundecanoic acid and 12-aminododecanoic acid, and also derivatives thereof, especially N-heptyl-11-aminoundecanoic acid.

When the aliphatic repeating unit is obtained from a unit derived from a lactam, it may be chosen from pyrrolidinone, 2-piperidinone, caprolactam, enantholactam, caprylolactam, pelargolactam, decanolactam, undecanolactam and lauryllactam.

When the aliphatic repeating unit is obtained from a unit derived from a unit corresponding to the formula (Ca diamine).(Cb diacid), the (Ca diamine) unit is chosen from linear or branched aliphatic diamines, cycloaliphatic diamines and alkylaromatic diamines.

When the diamine is aliphatic and linear, of formula $H_2N—(CH_2)a-NH_2$, the (Ca diamine) monomer is preferentially chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

When the diamine is aliphatic and branched, it may comprise one or more methyl or ethyl substituents on the main chain. For example, the (Ca diamine) monomer may advantageously be chosen from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the (Ca diamine) monomer is cycloaliphatic, it is preferentially chosen from piperazine, an aminoalkylpiperazine, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi(cyclohexylamine) (PACP). It may also comprise the following carbon backbones: norbornylmethane, cyclohexylmethane, dicyclohexylpropane, di(methylcyclohexyl), di(methylcyclohexyl)propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the (Ca diamine) monomer is alkylaromatic, it is preferentially chosen from 1,3-xylylenediamine and 1,4-xylylenediamine.

When the repeating unit is a unit corresponding to the formula (Ca diamine).(Cb diacid), the (Cb diacid) unit is chosen from linear or branched aliphatic diacids, cycloaliphatic diacids and aromatic diacids.

When the (Cb diacid) monomer is aliphatic and linear, it is preferentially chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20) and docosanedioic acid (b=22).

The fatty acid dimers mentioned above are dimerized fatty acids obtained by oligomerization or polymerization of unsaturated monobasic fatty acids bearing a long hydrocarbon-based chain (such as linoleic acid and oleic acid), as described especially in document EP 0 471 566.

When the diacid is cycloaliphatic, it may comprise the following carbon backbones: norbornylmethane, cyclohexylmethane, dicyclohexylmethane, dicyclohexylpropane, di(methylcyclohexyl), di(methylcyclohexyl)propane.

When the diacid is aromatic, it is preferentially chosen from terephthalic acid (noted T), isophthalic acid (noted I) and naphthenic diacids, in particular isophthalic acid.

Each aliphatic repeating unit (A) and (B) forms a polyimide.

Polyamides (A) and (B) are different from each other if (A) and (B) are simultaneously present in the copolyamide bearing amide units and polyether units.

In a more particularly preferred manner, the polyamide is obtained from only one aminocarboxylic acid, only one lactam or only one unit X.Y.

However, it may be entirely envisaged to use, in order to produce this polyamide, a mixture of two or more aminocarboxylic acids, a mixture of two or more lactams, but also a mixture of one, two or more aminocarboxylic acids with one, two or more lactams.

(C) represents a long-chain aliphatic repeating unit, obtained from an amino acid, a lactam, or a unit X.Y, in particular of C10 or more, especially of C11 and C12, or a mixture thereof.

Each aliphatic repeating unit (C) forms a polyamide.

Homopolyamides and copolyamides are distinguished by their number of carbon atoms per nitrogen atom, given that there are as many nitrogen atoms as amide groups (—CO—NH—).

The term "long-chain polyamide" should be understood as meaning a polyamide in which the number of carbons per nitrogen atom is greater than or equal to 10. In the case of a homopolyamide of PA-X.Y type, the number of carbon atoms per nitrogen atom is the average of the number of carbons in the unit X and of the number of carbons in the unit Y. Consequently, unit X or Y may have a number of carbons less than 10 provided that the polyamide X.Y formed has an average number of carbons greater than or equal to 10.

Advantageously, the polyamide present in the composition is an aliphatic polyamide, especially a polyamide X.Y, in particular a long-chain polyamide such as PA 11, PA 12, PA 10.10, PA 10.12, PA 6.14 or PA 12.12; in particular, the polyamide is chosen from PA11 and PA12.

In the case where (A) and (B) are present in the copolyamide bearing amide units and polyether units, each of the polyamides (A) and (B) is also different from (C).

The formula $(A)_x/(B)_y/(C)$ may thus correspond to the following three formulae:

(A)/(C) when y=0

(B)/(C) when x=0

(A)/(B)/(C) when x and y=1.

In one embodiment, when x and y=1, the structure of formula A/B/C corresponds to one of the following structures (S)n:

| Structure | A | B | C | Structure | A | B | C |
|---|---|---|---|---|---|---|---|
| S1 | $L_A$ | B | C | S2 | $AA_A$ | B | C |
| S3 | $X.Y_A$ | B | C | S4 | A | $L_B$ | C |
| S5 | A | $AA_B$ | C | S6 | A | $X.Y_B$ | C |
| S7 | A | B | $L_C$ | S8 | A | B | $AA_C$ |
| S9 | A | B | $X.Y_C$ | S10 | $L_A$ | $L_B$ | C |
| S11 | $L_A$ | $AA_B$ | C | S12 | $L_A$ | $X.Y_B$ | C |
| S13 | $AA_A$ | $L_B$ | C | S14 | $X.Y_A$ | $L_B$ | C |
| S15 | A | $L_B$ | $L_C$ | S16 | A | $L_B$ | $AA_C$ |

-continued

| Structure | A | B | C | Structure | A | B | C |
|---|---|---|---|---|---|---|---|
| S17 | A | $L_B$ | $X.Y_C$ | S18 | A | $AA_B$ | $L_C$ |
| S19 | A | $X.Y_B$ | $L_C$ | S20 | $L_A$ | B | $L_C$ |
| S21 | $L_A$ | B | $AA_C$ | S22 | $L_A$ | B | $X.Y_C$ |
| S23 | $AA_A$ | B | $L_C$ | S24 | $X.Y_A$ | B | $L_C$ |

$L_A$, $L_B$ and $L_C$ denote a lactam as defined, respectively, for A, B and C above, $AA_A$, $AA_B$ and $AA_C$ denote an amino acid as defined, respectively, for A, B and C above, $X.Y_A$, $X.Y_B$ and $X.Y_C$ denote a unit X.Y as defined, respectively, for A, B and C above. Advantageously, at least one from among $X.Y_A$, $X.Y_B$ and $X.Y_C$ consists of an aliphatic diamine and of an aliphatic diacid or of a piperazine and of an aliphatic diacid, advantageously, at least two from among $X.Y_A$, $X.Y_B$ and $X.Y_C$ consist of an aliphatic diamine and an aliphatic diacid or a piperazine and an aliphatic diacid.

In another embodiment, when x and y=1, the structure of formula A/B/C corresponds to one of the following structures (S)n:

| Structure | A | B | C | Structure | A | B | C |
|---|---|---|---|---|---|---|---|
| S26 | $L_A$ | $L_B$ | $L_C$ | S27 | $L_A$ | $L_B$ | $AA_C$ |
| S28 | $L_A$ | $L_B$ | $X.Y_C$ | S29 | $L_A$ | $AA_B$ | $L_C$ |
| S30 | $L_A$ | $X.Y_B$ | $L_C$ | S31 | $L_A$ | $AA_B$ | $AA_C$ |
| S32 | $L_A$ | $AA_B$ | $X.Y_C$ | S33 | $L_A$ | $X.Y_B$ | $AA_C$ |
| S34 | $L_A$ | $X.Y_B$ | $X.Y_C$ | S35 | $AA_A$ | $L_B$ | $L_C$ |
| S36 | $X.Y_A$ | $L_B$ | $L_C$ | S37 | $AA_A$ | $L_B$ | $AA_C$ |
| S38 | $AA_A$ | $L_B$ | $X.Y_C$ | S39 | $X.Y_A$ | $L_B$ | $AA_C$ |
| S40 | $X.Y_A$ | $L_B$ | $X.Y_C$ | S41 | $AA_A$ | $AA_B$ | $L_C$ |
| S42 | $AA_A$ | $X.Y_B$ | $L_C$ | S43 | $X.Y_A$ | $AA_B$ | $L_C$ |
| S44 | $X.Y_A$ | $X.Y_B$ | $L_C$ | S45 | $AA_A$ | $AA_B$ | $AA_C$ |
| S46 | $AA_A$ | $X.Y_B$ | $AA_C$ | S47 | $AA_A$ | $AA_B$ | $X.Y_C$ |
| S48 | $AA_A$ | $X.Y_B$ | $X.Y_C$ | S49 | $X.Y_A$ | $AA_B$ | $AA_C$ |
| S50 | $X.Y_A$ | $AA_B$ | $X.Y_C$ | S51 | $X.Y_A$ | $X.Y_B$ | $X.Y_C$ |
| S52 | $X.Y_A$ | $X.Y_B$ | $AA_C$ | | | | |

$L_A$, $L_B$ and $L_C$ denote a lactam as defined, respectively, for A, B and C above, $AA_A$, $AA_B$ and $AA_C$ denote an amino acid as defined, respectively, for A, B and C above, $X.Y_A$, $X.Y_B$ and $X.Y_C$ denote a unit X.Y as defined, respectively, for A, B and C above.

In one embodiment, when y=0, the structure of formula A/C corresponds to one of the following structures (S)n:

| Structure | A | C | Structure | A | C |
|---|---|---|---|---|---|
| S53 | $L_A$ | C | S54 | $AA_A$ | C |
| S55 | $X.Y_A$ | C | S56 | A | $L_C$ |
| S57 | A | $AA_C$ | S58 | A | $X.Y_C$ |

$L_A$ and $L_C$ denote a lactam as defined, respectively, for A and C above, $AA_A$ and $AA_C$ denote an amino acid as defined, respectively, for A and C above, $X.Y_A$ and $X.Y_C$ denote a unit X.Y as defined, respectively, for A and C above.

Advantageously, at least one from among $X.Y_A$ and consists of an aliphatic diamine and an aliphatic diacid or of a piperazine and an aliphatic diacid.

In another embodiment, when y=0, the structure of formula A/C corresponds to one of the following structures (S)n:

| Structure | A | C | Structure | A | C |
|---|---|---|---|---|---|
| S59 | $L_A$ | $L_C$ | S60 | $L_A$ | $AA_C$ |
| S28 | $L_A$ | $X.Y_C$ | S29 | $AA_A$ | $L_C$ |
| S30 | $AA_A$ | $AA_C$ | S31 | $AA_A$ | $X.Y_C$ |
| S32 | $X.Y_A$ | $L_C$ | S33 | $X.Y_A$ | $AA_C$ |
| S34 | $X.Y_A$ | $X.Y_C$ | | | |

$L_A$ and $L_C$ denote a lactam as defined, respectively, for A and C above, $AA_A$ and $AA_C$ denote an amino acid as defined, respectively, for A and C above, $X.Y_A$ and $X.Y_C$ denote a unit X.Y as defined, respectively, for A and C above.

Advantageously, at least one from among $X.Y_A$ and $X.Y_C$ consists of an aliphatic diamine and an aliphatic diacid or of a piperazine and an aliphatic diacid.

In one embodiment, when x=0, the structure of formula A/B corresponds to one of the following structures (S)n:

| Structure | A | B | Structure | A | B |
|---|---|---|---|---|---|
| S53 | $L_A$ | B | S54 | $AA_A$ | B |
| S55 | $X.Y_A$ | B | S56 | A | $L_B$ |
| S57 | A | $AA_B$ | S58 | A | $X.Y_B$ |

$L_A$ and $L_B$ denote a lactam as defined, respectively, for A and B above, $AA_A$ and $AA_B$ denote an amino acid as defined, respectively, for A and B above, $X.Y_A$ and $X.Y_B$ denote a unit X.Y as defined, respectively, for A and B above.

Advantageously, at least one from among $X.Y_A$ and $X.Y_B$ consists of an aliphatic diamine and an aliphatic diacid or of a piperazine and an aliphatic diacid.

In another embodiment, when x=0, the structure of formula A/B corresponds to one of the following structures (S)n:

| Structure | A | B | Structure | A | B |
|---|---|---|---|---|---|
| S59 | $L_A$ | $L_B$ | S60 | $L_A$ | $AA_B$ |
| S61 | $L_A$ | $X.Y_B$ | S62 | $AA_A$ | $L_B$ |
| S63 | $AA_A$ | $AA_B$ | S64 | $AA_A$ | $X.Y_B$ |
| S65 | $X.Y_A$ | $L_B$ | S66 | $X.Y_A$ | $AA_B$ |
| S67 | $X.Y_A$ | $X.Y_B$ | | | |

$L_A$ and $L_B$ denotes a lactam as defined, respectively, for A and B above, $AA_A$ and $AA_B$ denote an amino acid as defined, respectively, for A and B above, $X.Y_A$ and $X.Y_B$ denote a unit X.Y as defined, respectively, for A and B above.

Advantageously, at least one from among $X.Y_A$ and $X.Y_B$ consists of an aliphatic diamine and an aliphatic diacid or of a piperazine and an aliphatic diacid.

As Regards the Polyether Unit:

The polyether unit may correspond to polyether blocks bearing reactive ends, such as, inter alia:

1) polyoxyalkylene blocks bearing dicarboxylic chain ends.

2) polyoxyalkylene blocks bearing diamine chain ends obtained by cyanoethylation and hydrogenation of alpha-omega dihydroxylated aliphatic polyoxyalkylene blocks known as polyalkylene ether diols (polyetherdiols).

3) polyoxyalkylene ether polyols (or polyalkylene ether polyols), especially a polyalkylene ether diol, also known as polyetherdiols.

The copolyamide bearing amide units and polyether units may thus correspond to the products of condensation:

1) of polyamide blocks bearing diamine chain ends with polyoxyalkylene blocks bearing dicarboxylic chain ends, 2) of polyamide blocks bearing dicarboxylic chain ends with polyoxyalkylene blocks bearing diamine chain ends (or polyalkylene ether polyamine) defined above, 3) of polyamide blocks bearing dicarboxylic chain ends with polyetherdiols, the products obtained being, in this particular case, polyether ester amides.

The polyamide blocks bearing dicarboxylic chain ends are derived, for example, from the condensation of polyamide precursors in the presence of a chain-limiting dicarboxylic acid.

The polyamide blocks bearing diamine chain ends are derived, for example, from the condensation of polyamide precursors in the presence of a chain-limiting diamine.

The polymers bearing polyamide blocks and polyether blocks may also comprise randomly distributed units. These polymers may be prepared by the simultaneous reaction of the polyester unit and of the precursors of the amide unit(s).

For example, polyetherdiol, polyamide precursors and a chain-limiting diacid may be reacted. A polymer essentially bearing polyether blocks and polyamide blocks of very variable length is obtained, but also the various reagents that reacted randomly, which are randomly (statistically) distributed along the polymer chain.

Polyether diamine, polyamide precursors and a chain-limiting diacid may also be reacted. A polymer essentially bearing polyether blocks and polyamide blocks of very variable length is obtained, but also the various reagents that reacted randomly which are randomly (statistically) distributed along the polymer chain.

The copolyamide bearing amide units and polyether units may be prepared via the following process, in which:

in a first step, the amide units are prepared by polycondensation:
of the diamine(s);
of the dicarboxylic acid(s); and
where appropriate, of the comonomer(s) chosen from lactams and alpha-omega aminocarboxylic acids;
in the presence of a chain limiter chosen from dicarboxylic acids; and then
in a second step, the amide units obtained are reacted with polyether units, in the presence of a catalyst.

The general method for preparing in two steps the copolymers of the invention is known and is described, for example, in French patent FR 2 846 332 and in European patent EP 1 482 011.

The reaction for forming the amide units usually takes place between 180 and 300° C., preferably from 200 to 290° C., the pressure in the reactor becomes established at between 5 and 30 bar, and is maintained for about 2 to 3 hours. The pressure is reduced slowly by placing the reactor at atmospheric pressure, and the excess water is then distilled off, for example over one or two hours.

Once the polyamide bearing carboxylic acid ends has been prepared, the polyether and a catalyst are then added. The polyether may be added in one or more portions, and similarly for the catalyst. According to an advantageous form, the polyether is added first, the reaction of the OH end groups of the polyether and of the COOH end groups of the polyamide begins with formation of ester bonds and removal of water. As much water as possible is removed from the reaction medium by distillation, and the catalyst is then introduced to complete the bonding of the polyamide blocks and the polyether blocks. This second step is performed with stirring, preferably under a vacuum of at least 15 mmHg (2000 Pa) at a temperature such that the reagents and the copolymers obtained are in molten form. By way of example, this temperature may be between 100 and 400° C. and usually between 200 and 300° C. The reaction is continued by measuring the torque exerted by the molten polymer on the stirrer or by measuring the electrical power consumed by the stirrer. The end of the reaction is determined by the torque value or the target power value. One or more molecules used as antioxidant, for example Irganox® 1010 or Irganox® 245, may also be added during the synthesis, at the time judged to be the most appropriate.

The process for preparing the copolyamide may also be considered such that all the monomers are added at the start, i.e. in a single step, to perform the polycondensation:
of the diamine(s);
of the dicarboxylic acid(s); and
where appropriate, of the other polyamide comonomer(s);
in the presence of a chain limiter chosen from dicarboxylic acids;
in the presence of polyether units;
in the presence of a catalyst for the reaction between the amide units and the amide units.

Advantageously, the said dicarboxylic acid is used as chain limiter, which is introduced in excess relative to the stoichiometry of the diamine(s).

Advantageously, the catalyst used is a derivative of a metal chosen from the group formed by titanium, zirconium and hafnium or a strong acid such as phosphoric acid, hypophosphorous acid or boric acid.

The polycondensation may be performed at a temperature from 240 to 280° C.

The polyether unit may be used alone, in which case it cannot correspond to PEG, or as a mixture with one or more other polyethers; in the latter case, PEG may then be used.

Advantageously, the polyether unit is hydrophobic.

The copolyamide of the invention may thus have the following structures:

(A)/(C)/polyether when y=0

(B)/(C)/polyether when x=0

(A)/(B)/(C)/polyether when x and y=1.

Advantageously, the polyether is chosen from PPG, PTMG or a PEG-PPG mixture, an Elastamine® and a Jeffamine® predominantly bearing PPG or PTMG blocks.

In one embodiment, the copolyamide of the invention has one of the following structures:

Sn-polyether, n being from 1 to 67.

Advantageously, the polyether of the Sn-polyether structures is chosen from PPG, PTMG or a PEG-PPG mixture, an Elastamine® and a Jeffamine® predominantly bearing PPG or PTMG blocks.

As Regards the Additives:

The additives are chosen from stabilizers and dyes.

By way of example, the stabilizer may be a UV stabilizer, an organic stabilizer or, more generally, a combination of organic stabilizers, such as an antioxidant of phenol type (for example of the type such as Irganox® 245 or 1098 or 1010 from the company Ciba-BASF), an antioxidant of phosphite type (for example Irgaphos® 126 from the company Ciba-BASF) and even optionally other stabilizers such as a HALS product, which means Hindered Amine Light Stabiliser (for example Tinuvin® 770 from the company Ciba-BASF), an anti-UV agent (for example Tinuvin® 312 from the company Ciba), or a phosphorus-based stabilizer. Use may also be made of antioxidants of amine type such as Naugard® 445 from the company Crompton or alternatively polyfunctional stabilizers such as Nylostab S-EED® from the company Clariant.

This stabilizer may also be a mineral stabilizer, such as a copper-based stabilizer. By way of example of such mineral stabilizers, mention may be made of copper halides and acetates. Incidentally, other metals such as silver may optionally be considered, but they are known to be less effective. These copper-based compounds are typically combined with alkali metal halides in particular potassium halides.

Preferably, dyes are present in a proportion of from 0 to 1.5%, especially from 0.5% to 1% by weight relative to the total weight of the composition. Preferably, the stabilizers are present in a proportion of from 0 to 2% and especially from 0.5% to 1% by weight relative to the total weight of the composition.

Advantageously, the composition of the invention is free of plasticizer and especially of BBSA.

According to one embodiment, the composition of the invention is free of additives and corresponds to one of the copolyamides of the invention defined above:

(A)/(C)/polyether when y=0

(B)/(C)/polyether when x=0

(A)/(B)/(C)/polyether when x and y=1.

Advantageously, the polyether is chosen from PPG, PTMG or a PEG-PPG mixture, an Elastamine® and a Jeffamine® predominantly bearing PPG or PTMG blocks.

In one embodiment, the said copolyamide in the composition of the invention free of additive corresponds to one of the following structures:

Sn-polyether, n being from 1 to 67.

Advantageously, the polyether of the Sn-polyether structures is chosen from PPG, PTMG or a PEG-PPG mixture, an Elastamine® and a Jeffamine® predominantly bearing PPG or PTMG blocks.

In one embodiment, the composition of the invention comprises at least one additive, the said additive being in a proportion of up to 2%, advantageously up to 1.5% and more advantageously up to 1%.

The composition of the invention then corresponds to one of the copolyamides of the invention defined above with at least one additive:

(A)/(C)/polyether+at least one additive (B)/(C)/polyether+at least one additive (A)/(B)/(C)/polyether+at least one additive.

Advantageously, the polyether is chosen from PPG, PTMG or a PEG-PPG mixture, an Elastamine® and a Jeffamine® predominantly bearing PPG or PTMG blocks.

In one embodiment, the composition of the invention corresponds to one of the copolyamides of the invention defined above with at least one additive having the following structure:

Sn-polyether+at least one additive, n being from 1 to 67.

Advantageously, the polyether of the Sn-polyether structures is chosen from PPG, PTMG or a PEG-PPG mixture, an Elastamine® and a Jeffamine® predominantly bearing PPG or PTMG blocks.

The Applicant thus found, entirely unexpectedly, that a copolyamide consisting of at least two polyamides, at least one of which is a long-chain polyamide, and comprising polyether units, especially hydrophobic polyether units, makes it possible to obtain a composition whose Tm is from about 90 to about 150° C., in particular from about 100° C. to about 125° C. and whose flexural modulus is less than 100 MPa and which makes it possible to manufacture heat-sensitive adhesives that have very good properties in terms of resistance to washing, implementation, resistance and flexibility under cold conditions, and which do not yellow over time, when compared with the prior art products and especially TPUs, and which thus allow the manufacture of textiles without stitching, especially tights, stockings or clothing, which are more pleasant to wear and which have an improved aesthetic aspect when compared with the same products with stitching.

Advantageously, the flexural modulus of the composition of the invention is from about 10 to about 80 and in particular from about 50 to 80 MPa, the flexural modulus especially being equal to about 80 MPa, and in particular it is equal to 50 MPa.

Advantageously, the composition of the invention also has a melt volume-flow rate (MVR) from about 5 to 200 $cm^3/10'$, preferentially from about 10 to about 100 $cm^3/10'$, especially from about 15 to about 50 $cm^3/10'$, in particular of about 20 $cm^3/10'$, at 275° C. under a load of 2.16 kg as determined according to standard ISO 1133-2 (2011).

Advantageously, the said at least one diamine is chosen from a linear or branched aliphatic diamine and a cycloaliphatic diamine or a mixture thereof, and the said diacid is chosen from an aliphatic diacid, a cycloaliphatic diacid and an aromatic diacid.

Advantageously, the said at least one diamine is chosen from a linear or branched aliphatic diamine, a cycloaliphatic diamine and an aromatic diamine or a mixture thereof and the said diacid is chosen from an aliphatic diacid and a cycloaliphatic diacid.

Advantageously, the said at least one diamine is chosen from a linear or branched aliphatic diamine and a cycloaliphatic diamine or a mixture thereof and the said diacid is chosen from an aliphatic diacid and a cycloaliphatic diacid. In this embodiment, the composition of the invention therefore does not contain any aromatic or semi-aromatic polyamide, which makes it possible to provide a composition having a lower density than that of TPUs which comprise aromatic or semi-aromatic units. Advantageously, the density of the composition of the invention is about 1.04 as determined according to standard ISO 1183-1 (2012).

Advantageously, the weight proportion of long-chain aliphatic repeating unit in the said amide unit of the composition of the invention is from 40% to 95%, especially from 50% to 95%, especially from 60% to 80%, in particular from 70% to 80%.

The proportions indicated here are those of the amide units excluding the polyether units.

The Applicant has also found, surprisingly, that the resistance to washing was afforded by a proportion of long-chain aliphatic repeating unit of C10 or more in the copolyamide that is as high as possible.

Advantageously, the weight proportion of polyether in the composition of the invention is greater than 40%, in particular from 50% to 80% and especially about 50%.

The proportions indicated here are those of the ether units in the total copolyamide.

The Applicant has also found that the polyether, especially the hydrophobic polyether, afforded flexibility to the copolyamide.

Nevertheless, when more than 80% by weight of polyether relative to the total weight of copolyamide is present, the resistance to washing decreases.

Consequently, the combination of long-chain aliphatic repeating unit in high proportion relative to the other amide units with the presence of polyether units, in high proportion relative to the total copolyamide but less than 80% by weight, makes it possible to obtain the flexibility and wash resistance properties.

The other properties of the copolyamide are afforded by the other constituents thereof.

Advantageously, the polyalkylene ether polyol of the composition of the invention is chosen from PPG, PTMG or a PEG-PPG mixture and the polyalkylene ether polyamine is chosen from an Elastamine® or a Jeffamine® predominantly bearing PPG or PTMG blocks. The term "predominantly" should be understood as meaning more than 50%.

In particular, the polyalkylene ether polyol is PTMG.

The number-average molecular mass of the polyether blocks is advantageously from 200 to 4000 g/mol, preferably from 250 to 2500 g/mol, especially from 300 to 1000 g/mol, in particular 1000.

Advantageously, the said amide unit of the composition according to the invention is chosen from one of the following structures: 6/X.Y/(C) and Pip.Y/X.Y/(C), X, Y and C being as defined above and Pip denoting piperazine.

Advantageously, the copolyamide is 6/X.Y/(C)/PTMG, in particular with a molecular mass of 1000/1000 for the amide units and the polyether units, respectively.

Advantageously, the copolyamide is Pip.10/X.Y/(C)/PTMG, in particular with a molecular mass of 1000/1000 for the amide units and the polyether units, respectively.

Advantageously, the said amide unit in the copolyamide of the composition according to the invention is chosen from: 6/6.6/12, 6/6.10/12, 6/11/12 and Pip. 10/6.10/12, and in particular the said amide unit is 6/11/12.

Advantageously, the copolyamide is 6/11/12/PTMG, in particular with a molecular mass of 1000/1000 for the amide units and the polyether units, respectively.

In particular, the weight proportion of each constituent of the amide unit 6/11/12 is 20/10/70.

Advantageously, the said amide unit of the composition of the invention is chosen from one of the following structures: (A)/(C) and X.Y/(C), (A) corresponding to an aliphatic repeating unit chosen from a unit obtained from at least one amino acid and a unit obtained from at least one lactam as defined above and X.Y being as defined above.

Advantageously, the copolyamide is (A)/(C)/PTMG, in particular with a molecular mass of 1000/1000 for the amide units and the polyether units, respectively.

Advantageously, the copolyamide is X.Y/(C)/PTMG, in particular with a molecular mass of 1000/1000 for the amide units and the polyether units, respectively.

Advantageously, the said amide unit in the copolyamide of the composition of the invention is chosen from: 6/12, 11/12, 6.10/12 and Pip.10/12, in particular 6/12.

Advantageously, the copolyamide is 6/12/PTMG, in particular with a molecular mass of 1000/1000 for the amide units and the polyether units, respectively.

In particular, the weight proportion of each constituent of the amide unit 6/12 of the copolyamide is 25/75 or 30/70.

According to another aspect, the invention relates to a heat-sensitive adhesive of the HMA (hot melt adhesive) type consisting of a composition of the invention as defined above.

HMAs are thermoplastic adhesives which are constituted to be melted by heating and which, when applied to two parts of a textile, allow, after cooling, end-to-end bonding of the two parts, thus avoiding stitching to join the two parts together.

Advantageously, the heat-sensitive adhesive as defined above is chosen in particular from a veil, a film, granules, a filament, a grate, a powder and a suspension.

The thickness of the adhesive, excluding the filament, the granules, the powder or the suspension according to the invention, is from 5 to 200 µm (equivalent to 5 to 200 g/m$^2$ which corresponds to another unit of measurement), in particular from 5 to 100 µm depending on the type of adhesive used, for example the thickness of a veil is from 5 to 30 µm, the thickness of a film is from 20 to 100 µm, and the thickness of a grate is from 10 to 50 µm.

As regards the filaments, there is no basis weight, but rather a weight per 1 km of yarn.

As regards the powder, five types of powder may be used, chosen especially from:
from more than 0 to 80 microns
from more than 0 to 120 microns
from 80 to 180 microns
from 80 to 200 microns
from 200 to 500 microns.

As regards the suspension, the above powder is suspended, especially in water, in particular to a concentration from 40% to 50%.

Advantageously, the said adhesive as defined above, especially in film form, has a thickness of from 20 to 55 µm and an adhesion (or adherence) to a textile, especially cotton, Lycra®, polyamide or polyester, of greater than 3 N/cm, in particular from 3 to 15 N/cm, as determined by the T peel test at 100 mm/min.

The T peel test is based on the use of flexible-on-flexible bonded assemblies as described in standard ISO 11339: 2010.

The adhesion (or adherence) of the adhesive of the invention to a textile depends on several parameters such as the type of textile, the thickness of the adhesive and the lamination temperature, i.e. the temperature at which the adhesive is melted for bonding to the textile, and also the method of measurement.

In particular, the said adhesive as defined above, especially in film form, in particular of 6/12/PTMG (1000/1000), has an adhesion (or adherence) of about 14 N/cm to cotton (cotton/polyester mixture: 90/10) for a thickness of about 30 µm with a lamination temperature of 120° C. and an adhesion (or adherence) of about 12 N/cm to Lycra® for a thickness of about 30 µm with a lamination temperature of 120° C.

In particular, the said adhesive as defined above, especially in film form, in particular of 6/12/PTMG (1000/1000), has an adhesion (or adherence) from about 11 to about 22 N/cm to cotton (cotton/polyester mixture: 90/10) for a thickness of about 60 µm with a lamination temperature of from 140° C. to 180° C.

Advantageously, the ratio of the adhesion (or adherence), especially of an adhesive as defined above in film form of 60 µm, in particular of 6/12/PTMG (1000/1000), to the adhesion (or adherence) especially of a film of TPU of the same thickness, to cotton (cotton/polyester mixture: 90/10), is from 4 to 8 for a lamination temperature of from 140 to 160° C.

Advantageously, the said adhesive as defined above, especially in film form, in particular of 6/12/PTMG (1000/1000), has a thickness of from 55 to 90 µm and an adhesion (or adherence) to a textile, especially cotton and Lycra®, of greater than 5 N/cm, in particular from 5 to 16 N/cm as determined by the T peel test at 100 mm/min.

Advantageously, the said adhesion (or adherence) is determined at a lamination temperature of the heat-sensitive adhesive as defined above, especially in film form, of from 120 to 180° C., in particular from 140 to 160° C.

The said heat-sensitive adhesive as defined above, when it is in film form, may consist of a single layer or may be in stacked form, i.e. comprising at least two layers.

By way of example, the said adhesive in film form with a thickness of 60 µm may be a film of a layer of 60 µm or two layers of 30 µm or three layers of 20 µm, . . . , i.e. as many layers as the thickness of the film divided by the thickness of one layer.

Advantageously, the said heat-sensitive adhesive as defined above has a loss of adhesion (or adherence) after at least two washes at 40° C. from about 2% to about 18%.

The loss of adhesion (or adherence) is especially measured on a 60 µm and cotton (cotton/polyester: 90/10).

The ratio of the residual adhesion (or adherence) (initial adhesion (or adherence) value minus the loss of adhesion (or adherence)) after at least two washes at 40° C. at a temperature of 140° C. of a heat-sensitive adhesive, in particular in the form of a film of 6/12/PTMG (1000/1000) of 60 µm, to the residual adhesion (or adherence) after at least two washes at 40° C. at a lamination temperature of 140° C. of a TPU with a Tm of 120° C. is at least 1.6.

In particular, the ratio of the residual adhesion (or adherence) after at least two washes at 40° C. at a lamination temperature of 160° C. of a heat-sensitive adhesive, in particular in the form of a film of 6/12/PTMG (1000/1000) of 60 µm, to the residual adhesion (or adherence) after at least two washes at 40° C. at a amination temperature of 160° C. of a TPU with a Tm of 150° C. is at least 1.9.

Advantageously, the said heat-sensitive adhesive as defined above has a loss of adhesion (or adherence) after at least two washes at 60° C. from about 2% to about 30%.

The loss of adhesion (or adherence) is especially measured on a film 30 µm or 60 µm and cotton (cotton/polyester: 90/10) or Lycra®.

The ratio of the residual adhesion (or adherence) after at least two washes at 60° C. at a temperature of 120° C. of a heat-sensitive adhesive, in particular in the form of a film of 6/12/PTMG (1000/1000) of 30 µm, to the residual adhesion (or adherence) after at least two washes at 60° C. at a lamination temperature of 120° C. of a TPU with a Tm of 100° C. is at least 5.3.

In particular, the ratio of the residual adhesion (or adherence) after at least two washes at 60° C. at a lamination temperature of 160° C. of a heat-sensitive adhesive, in particular in the form of a film of 6/12/PTMG (1000/1000) of 60 µm, to the residual adhesion (or adherence) after at least two washes at 60° C. at a lamination temperature of 160° C. of a TPU with a Tm of 150° C. is at least 3.

Advantageously, the said heat-sensitive adhesive as defined above has colour stability properties and improved implementation properties.

The term "colour stability" means that the yellowing is less after a thermal or UV treatment.

The said properties are improved especially relative to a TPU adhesive.

According to another aspect, the present invention relates to the use of a composition as defined above, for the manufacture of a heat-sensitive adhesive, in particular a veil, a film, granules, a filament, a grate, a powder or a suspension.

Advantageously, the heat-sensitive adhesive as defined above is used in the textile industry, especially for the manufacture of articles without stitching, such as stockings, tights or sports clothing, especially winter sports clothing.

From left to right:

Lamination temperature=120° C.: 14 N/cm: 6/12/PTMG and 4 N/cm: TPU1 (films of 30 µm on cotton);

Lamination temperature=120° C.: 12 N/cm: 6/12/PTMG and 6 N/cm: TPU1 (films of 30 µm on Lycra®);

Lamination temperature=140° C.: 11 N/cm: 6/12/PTMG and 2 N/cm: TPU2 (films of 60 µm on cotton);

Lamination temperature=160° C.: 16 N/cm: 6/12/PTMG, 4 N/cm: TPU2 and 2 N/cm: TPU3 (films of 60 µm on cotton);

Lamination temperature=180° C.: 22 N/cm: 6/12/PTMG and 3 N/cm: TPU3 (films of 60 µm on cotton).

Irrespective of the film thickness, the fabric used and the lamination temperature, the adhesion (or adherence) of the films of the invention is very markedly superior to that of the three TPUs used.

Figure 2:
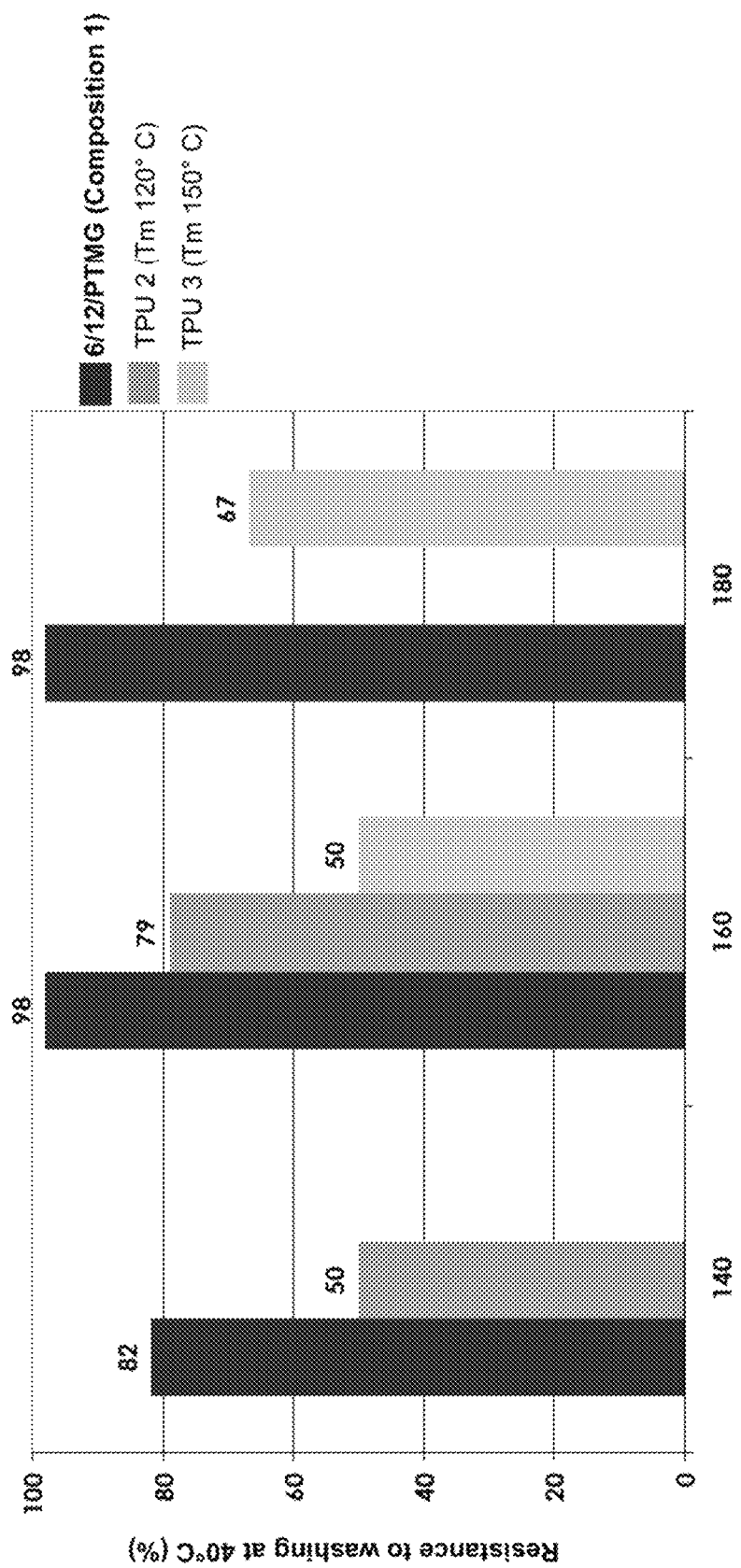

FIG. 2 shows the resistance to washing at 40° C. of films of 60 µm of TPU (2: Tm=120° C., 3: Tm=150° C.) or of the invention (6/12/PTMG (1000/1000 MW amide units and polyether units, respectively): composition 1, Tm=110° C.) on cotton (cotton: 90%, polyester: 10%) as a function of the lamination temperature.

From left to right:

Lamination temperature=140° C.: 82%: 6/12/PTMG and 50%: TPU2;

Lamination temperature=160° C.: 98%: 6/12/PTMG, 79%: TPU2 and 50% TPU3;

Lamination temperature=180° C.: 98%: 6/12/PTMG and 67%: TPU3.

The resistance to washing at 40° C. of the films of the invention is very markedly superior to that of the TPUs irrespective of the lamination temperature.

Figure 3:
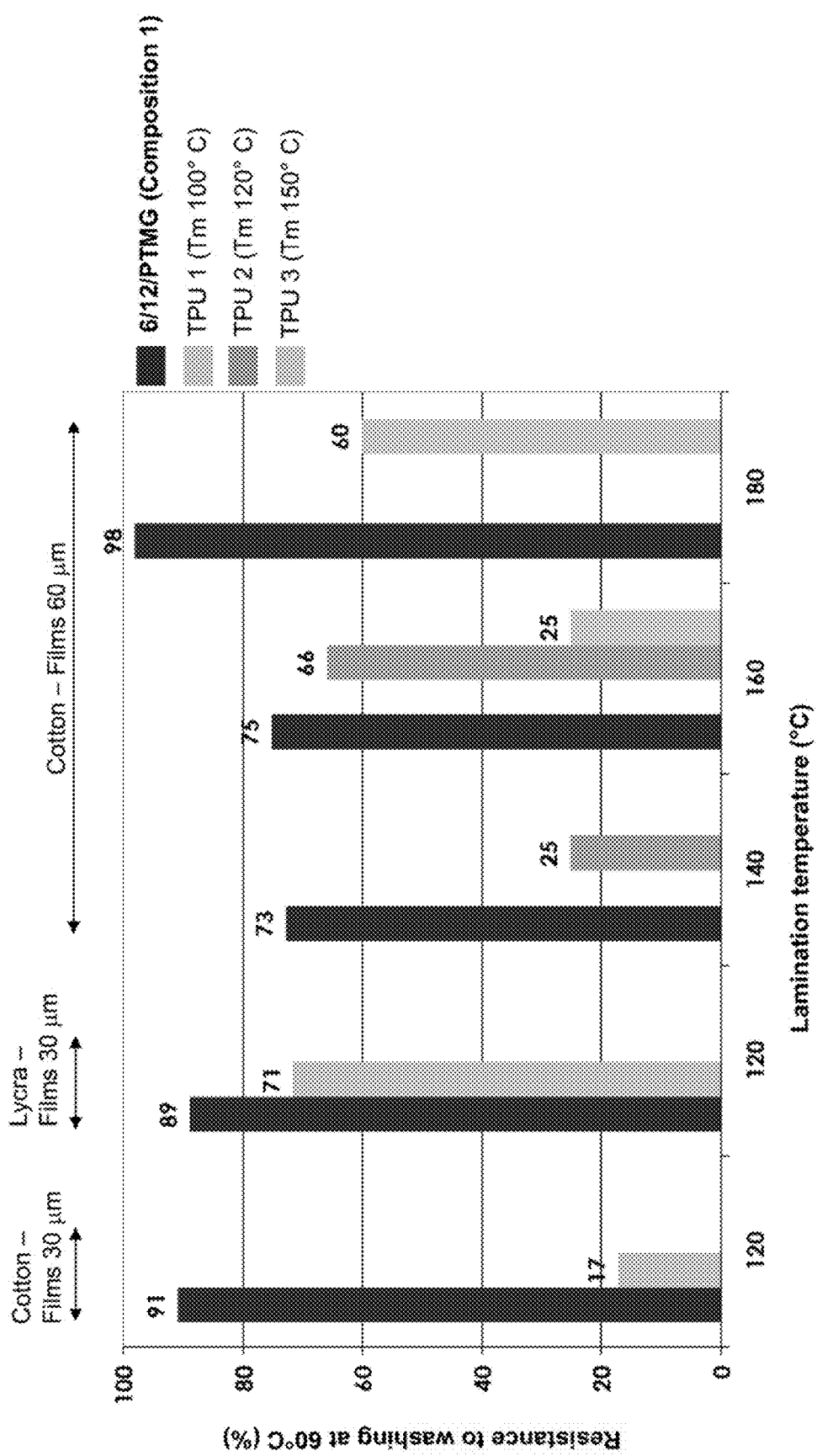

FIG. 3 shows the resistance to washing at 60° C. of films of 60 µm of TPU (1: Tm=100° C., 2: Tm=120° C., 3: Tm=150° C.) or of the invention (6/12/PTMG (1000/1000, MW amide units and polyether units, respectively): composition 1, Tm=110° C.) on cotton (cotton: 90%, polyester: 10%) or Lycra® as a function of the lamination temperature.

Lamination temperature=120° C.: 91%: 6/12/PTMG and 17%: TPU1 (films of 30 µm on cotton);

Lamination temperature=120° C.: 89%: 6/12/PTMG and 71: TPU1 (films of 30 µm on Lycra®);

Lamination temperature=140° C.: 73%: 6/12/PTMG and 25%: TPU2 (films of 60 µm on cotton);

Lamination temperature=160° C.: 75%: 6/12/PTMG, 66%: TPU2 and 25% TPU3 (films of 60 µm on cotton);

Lamination temperature=180° C.: 96%: 6/12/PTMG and 60%: TPU3 (films of 60 µm on cotton).

The resistance to washing at 60° C. of the films of the vention is very markedly superior to that of the TPUs irrespective of the lamination temperature, the textile used or the thickness of the film.

EXAMPLES

Example 1

Compositions of the Invention

Compositions are prepared according to the techniques known to those skilled in the art.

The melting point is measured by DSC (differential scanning calorimetry) according to standard 11357-3 (2013) or according to DIN 53736, Volume B (visual determination of the melting point of semi-crystalline polymers) optically using a heating bench and a microscope.

Composition 1: 6/12/PTMG (1000/1000, PA6/PA12 (30/70). DSC $1^{st}$ heating: 114.8° C.

The composition is detailed in Table I below:

TABLE I

| Starting material | Weight | Unit |
| --- | --- | --- |
| Sebacic acid | 4.63 | kg |
| PTMG1000 | 22.46 | kg |
| Lactam 6 | 5.40 | kg |
| Lactam 12 | 12.60 | kg |
| Water | 4.00 | kg |
| Anti-UV | 225.00 | g |
| Antioxidant | 135.00 | g |
| Zirconium butoxide | 67.50 | g |

Composition 2: 6/12/PTMG (1000/1000, PA6/PA12 (25/75)).

DSC $1^{st}$ heating: 124.6° C.

The composition is detailed in Table II below:

TABLE II

| Starting material | Weight | Unit |
| --- | --- | --- |
| Sebacic acid | 4.63 | kg |
| PTMG1000 | 22.46 | kg |
| Lactam 6 | 4.50 | kg |
| Lactam 12 | 13.50 | kg |
| Water | 4.00 | kg |
| Anti-UV | 225.00 | g |
| Antioxidant | 135.00 | g |
| Zirconium butoxide | 67.50 | g |

Composition 3: 6/11/12/PTMG (1000/1000, PA6/PA11/PA12 (20/10/70)).

DSC $1^{st}$ heating: 116.5° C.

The composition is detailed in Table III below:

TABLE III

| Starting material | Weight | Unit |
| --- | --- | --- |
| Sebacic acid | 4.63 | kg |
| PTMG1000 | 22.46 | kg |

TABLE III-continued

| Starting material | Weight | Unit |
| --- | --- | --- |
| Lactam 6 | 3.60 | kg |
| Amino 11 | 1.80 | |
| Lactam 12 | 12.60 | kg |
| Water | 4.00 | kg |
| Anti-UV | 225.00 | g |
| Antioxidant | 135.00 | g |
| Zirconium butoxide | 67.50 | g |

Example 2

Test of Adhesion (or Adherence) of the Compositions of the Invention

Figure 1:
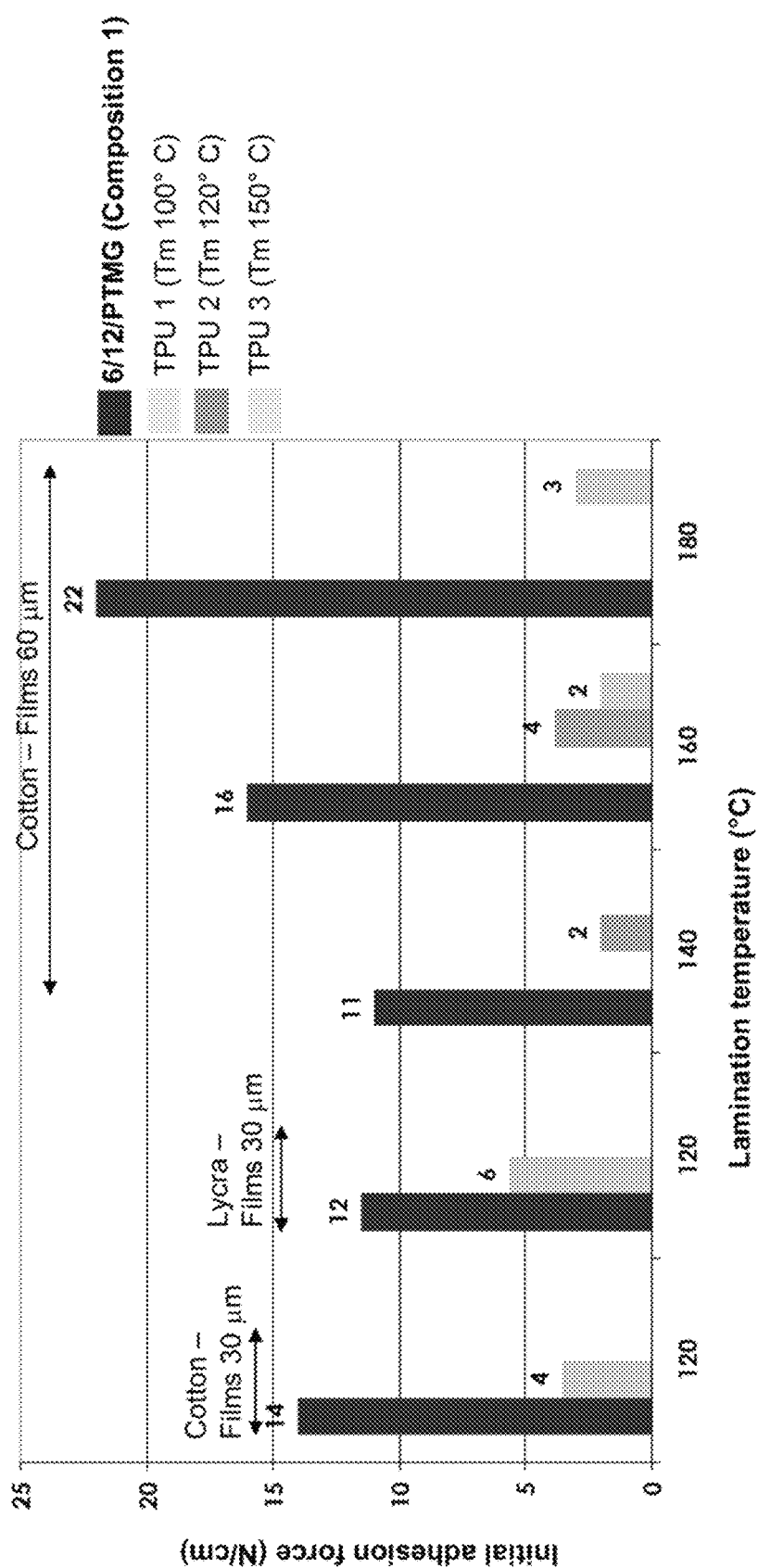
FIG. 1 shows the initial adhesion (or adherence) force in N/cm as a function of the lamination temperature, of films of 30 µm or 60 µm of TPU (1: Tm=100° C., 2: Tm=120° C., 3: Tm=150° C.) or of the invention (6/12/PTMG (1000/1000, MW amide units and polyether units, respectively): composition 1, Tm=110° C.) laminated on cotton (cotton: 90%, polyester: 10%) or Lycra® at various temperatures.

Lamination machine: model HP-450M,MS
   Pressure: 1.0 kg/cm$^2$
   Bonding time: 25 sec
Peeling machine: Hongda Tensometer
   Peel test at 100 mm/min
Type of HMA
   6/12/PTMG (composition 1)
   3 different types of aliphatic or aromatic TPU: TPU1: Tm=100° C., TPU2: Tm=120° C., TPU3: Tm=150° C., sold by Bayer under the brand name Desmapan® or BASF under the brand name Elastollan®.
Types of textiles:
   Cotton® (cotton 90%, polyester 10%)
   Lycra®
   The adhesion (or adherence) tests are presented in FIG. 1.

Example 3

Resistance to Washing

The various heat-sensitive adhesives are subjected to two machine washes for 1 hour 30 minutes for each wash and then to drying.

The washing tests are presented in FIGS. 2 and 3.

Comparison of the Heat-Sensitive Adhesive Properties

Table IV presents the comparison of the properties of a heat-sensitive adhesive consisting of a composition of the invention (6/12/PTMG: 1000/1000): composition 1 with those of TPU or of a standard copolyamide.

TABLE IV

| PROPERTIES | TPU | Standard CoPA | Composition 1 |
| --- | --- | --- | --- |
| Soft hand | ++ | − | + |
| Resistance to washing | Up to 40° C. | From 40° C. to 90° C. | Up to 60° C. |
| Yellowing | − | + | + |
| Implementation | − | + | + |

− means that the product does not have the property under consideration.

+ means that the product has the property under consideration in satisfactory manner.

++ means that the product has the property under consideration in an excellent manner.

The soft hand determines the flexibility of the compound.

The comparison of the observed properties shows that only the adhesive of the invention has the four properties described in this figure.

Table V shows the comparison of the major properties of various heat-sensitive adhesives.

TABLE V

| PROPERTIES | TPU | Standard CoPA | 6/6.12/11/PEG.12 at 25/20/25130 Comparative composition | 6/12/PTMG (1000/1000) Composition 1 |
|---|---|---|---|---|
| Modulus at 23° C. | 5 | 300 | 200 | 90 |
| Resistance to washing | Up to 40° C. | From 40° C. to 90° C. | Up to 40° C. | Up to 60° C. |
| Tm | 80 to 150° C. | 80 to 135° C. | 100° C. | 110° C. |

The TPUs have a suitable modulus but are not resistant to washing. Moreover, they are difficult to implement for the preparation of films.

The standard CoPAs show very good resistance to washing but have an excessively high modulus for the heat-sensitive adhesive application.

6/6.12/11/PEG.12 shows poor resistance to washing and moreover has an excessively high modulus for the heat-sensitive adhesive application.

Only the compounds of the invention of CoPA/PTMG type have both satisfactory modulus and wash-resistance values.

The invention claimed is:

1. A method of using a heat-sensitive adhesive in the textile industry, comprising the steps of:
   a) forming a heat-sensitive adhesive composition of a HMA (hot-melt adhesive), consisting of on a weight basis, the total being equal to 100%:
      from 98% to 100% of at least one copolyamide bearing amide units and polyether units, having a melting point ($T_m$) from about 100° C. to about 125° C., and having a flexural modulus less than 100 MPa, as determined according to standard ISO 178 (2010); the said amide unit being 6/12, with a weight proportion of the long chain aliphatic repeat unit C12 of the amide unit being from 70% to 80%, the polyether units being derived from polytetramethtylene glycol (PTMG), the weight proportion of polyether units in the copolyamide being greater than 50%,
      from 0 to 2% of at least one additive chosen from stabilizers and dyes, or a mixture thereof wherein said heat-sensitive adhesive is selected from the group consisting a veil, a film, in granules, a filament, and a grate;
   b) melting said heat-sensitive composition by heating;
   c) applying said adhesive to two parts of a textile;
   d) allowing said heat-sensitive adhesive composition to cool.

2. The method of claim 1, wherein said method results in end-to-end bonding of the two parts of a textile.

3. The method of claim 1, wherein said Method results in two parts of a textile joined together without stitching.

4. The method according to claim 1, said adhesive having a thickness of from 5 to 30 micrometers for a veil, 20 to 100 micrometers for a film and 10 to 50 micrometers for a grate, and said adhesive having an adherence to a textile, of greater than 3 N/cm, as determined by the T peel test at 100 mm/min.

5. The method according to claim 4, said adhesive having an adherence to a textile, of greater than 5 N/cm, as determined by the T peel test at 100 mm/min.

6. The method according to claim 4, wherein the adherence is determined at a lamination temperature of from 120 to 180° C.

7. The method according to claim 1, having a loss of adherence after at least two washes at 40° C. from about 2% to about 18%.

8. The method according to claim 1 having a loss of adherence after at least two washes at 60° C. from about 2% to about 30%.

* * * * *